United States Patent [19]

Kakwashima

[11] Patent Number: 5,422,942

[45] Date of Patent: Jun. 6, 1995

[54] INCOMING CALL TRANSFER TERMINAL

[75] Inventor: Isao Kakwashima, Kanagawa, Japan

[73] Assignee: Sony Corporation, Tokyo, Japan

[21] Appl. No.: 118,632

[22] Filed: Sep. 10, 1993

[30] Foreign Application Priority Data

Sep. 14, 1992 [JP] Japan .................................. 4-270954

[51] Int. Cl.⁶ ............................................. H04M 3/58
[52] U.S. Cl. ..................................... 379/212; 379/201;
379/207; 370/62; 370/110.1
[58] Field of Search ........................ 379/89, 93, 96, 94,
379/112, 142, 158, 211, 88, 263, 100, 199, 201,
157, 202, 309, 212, 210, 207, 127, 245, 246, 247;
370/60.1, 110.1

[56] References Cited

U.S. PATENT DOCUMENTS

| | | | |
|---|---|---|---|
| 5,023,868 | 6/1991 | Davidson et al. | 379/142 |
| 5,291,492 | 3/1994 | Andrews et al. | 379/157 |
| 5,303,235 | 4/1994 | Chan et al. | 370/60.1 |

FOREIGN PATENT DOCUMENTS

0487811A1  6/1992  European Pat. Off. .

OTHER PUBLICATIONS

"A Study Of Audio Communication Devices for ISDN", IEEE Transactions on Consumer Electronics, 36 (1990) Aug., No. 3.

"Voice and Data Workstations and Services in the ISDN", Ericsson Review 61 (1984) May P14-19.

"Telecommunication Switching", Proceedings of the International Switching Symposium, May 7-11, 1984.

Primary Examiner—James L. Dwyer
Assistant Examiner—Scott Wolinsky
Attorney, Agent, or Firm—Hill, Steadman & Simpson

[57] ABSTRACT

An incoming call transfer terminal for transferring to a third-party terminal a call-setting message coming from a calling terminal. The incoming call transfer terminal receives the call-setting message over a first communication channel from the calling terminal. Given the message, the incoming call transfer terminal generates a new call-setting message destined to the third-party terminal by keeping intact those parts of the original message which are needed to establish a through communication channel from the calling terminal to the third-party terminal; by also preserving such information unique to the calling terminal as a calling sub-address and a called sub-address to be transmitted unchanged to the third-party terminal; and by rewriting other parts of the original message to indicate that the call is being transferred from the incoming call transfer terminal. The calling number of the calling terminal is transferred as carried on the calling sub-address, called sub-address or user-user information. The call-setting message thus generated is sent automatically to the third-party terminal over a second communication channel.

15 Claims, 11 Drawing Sheets

INCOMING CALL TRANSFER TERMINAL

BACKGROUND OF THE INVENTION

The present invention relates to an incoming call transfer terminal connected for use with communication networks such as an ISDN (Integrated Services Digital Network) operating according to the call control method defined by the I Series Recommendations of the CCITT International Telegraph and Telephone Consultative Committee.

The ISDN is known to be capable of communicating the presence of a call from a specific communication terminal to a called communication terminal using a calling sub-address, i.e., one of the usable elements of information defined by the I Series Recommendations of the CCITT. The calling sub-address is also used to communicate personal identification information by which to specify a person (i.e., name of the calling party). This scheme eliminates one disadvantage of prior art analog telephone networks. That is, old networks let the called party know which terminal is calling and who is calling only after a communication channel had been established between the parties. The ISDN allows such information to be communicated to the called party before the communication channel is set up.

With the ISDN, one communication channel is constituted by two B channels (information channels on which to transmit call-related information at a transmission speed of, say, 64 kb/s) and one D channel (signal channel on which to transmit call control information at a transmission speed of, say, 16 kb/s). Because the capacity of the D channel is sufficiently large, the call control information that may be transmitted includes not only the minimum required control information such as the other party's telephone number, but also a calling number (i.e., the caller's subscriber number) and a predetermined length of other desired information (user-user information). The call control information is transmitted before the called party responds.

The telephone set connected to the ISDN may be equipped with a call-selecting function. That is, the telephone set stores in its built-in memory the subscriber numbers of the parties that the owner of the set is willing to respond to. When a call comes in, a check is made to see if the calling number transmitted over the D channel coincides with any of the numbers stored. A response is allowed only if one of the stored subscriber numbers is found to match the calling number. This keeps off any unwanted sales pitch by telephone and wrong number calls, among others.

With the ISDN, a communication channel is established between a calling and a called terminal based on two kinds of information. One kind of information is the information necessary for setting up a communication channel. It comprises a calling number (i.e., the calling party's subscriber number transmitted initially from the calling terminal to the called terminal), a called number (the called party's subscriber number), the information transmission capability of the network in question, the type of communicating terminals, and channels to be used. The other kind of information is a call-setting message formed from various elements of information for setting the information specific to the calling party such as the calling sub-address and called address.

There are cases in which an incoming call is desired to be transferred to a third party using a terminal capable of such transfer (called the incoming call transfer terminal). In such cases, it is naturally preferable that the call-setting message from the calling terminal would be transferred unchanged to the third party's terminal. In practice, only the call-setting message prepared by the incoming call transfer terminal is transmitted to the third party. There is at present no way of conveying the calling party's call-setting message to the transfer destination.

This is a major disadvantage of the prior art incoming call transfer terminal: its inability to transfer the calling party's call-setting message to a third party when transferring the incoming call to the latter.

On a communication network such as the ISDN capable of transmitting a calling party's subscriber number (calling-number) to a party being called, the called party knows the calling number before responding. This allows the called party to choose from a number of ways to deal with the incoming call. There may be a case in which the called party wants to transfer the incoming call to a third party using another subscriber line via the incoming call transfer terminal. In such a case, however, the calling party's subscriber number is not transferred to the third party. This disadvantage is bypassed conventionally in a number of ways. One way is for the incoming call transfer terminal (practiced typically as an incoming call transfer telephone set) to determine whether or not to transfer the call depending on the calling number received. Another way is for the incoming call transfer telephone set to call the third party using a special ringing tone indicating that the current call is being transferred. Yet another way is for the incoming call transfer telephone set to give the third party a voice message saying that the call is being transferred after the third party has responded and a communication channel is established.

As described, all that the prior art incoming call transfer terminal can do in informing the third party of the call being transferred is to use a special ringing tone or employ a voice message after the third party has responded and the communication channel is established. With the prior art, it is impossible to notify the third party of the calling party's subscriber number (calling number).

SUMMARY OF THE INVENTION:

It is therefore a general object of the present invention to provide an incoming call transfer terminal which, when an in coming call is desired to be transferred to a third party, notifies the third party of the calling party's call-setting message as well as the calling party's calling number while the third party is being called, so that the third party knows the calling number before responding.

A more specific object of the invention is to provide an incoming call transfer terminal allowing a called terminal to deal exactly in the same manner with calls coming in from a calling terminal through two different paths, as in the setup of FIG. 2 wherein a calling terminal A used by a third party makes calls over two paths: one through the ISDN direct to a called terminal C that a called party uses at his home, the other through the ISDN via an incoming call transfer terminal B that the called party uses at his work place and on to the called terminal C.

In carrying out the invention and according to one aspect thereof, there is provided an incoming call transfer terminal comprising: receiving means for receiving a first call-setting message transmitted from a calling terminal over a first communication channel; call-setting message generating means for generating a second call-setting message by keeping intact those parts of the received first call-setting message which need to be transferred from the calling terminal to a third-party terminal and by rewriting those parts of the first call-setting message which need to be communicated from the called terminal to the third-party terminal; and transmitting means for calling the third party over a second communication channel by use of the second call-setting message generated by the call-setting message generating means.

With this structure, the transmitted first call-setting message is received initially by the incoming call transfer terminal over the first communication channel. At that point, with the ringing of the calling party allowed to continue, the first call-setting message is copied unchanged to the second call-setting message. In addition, part of the message is rewritten so as to indicate that it comes via an incoming call transfer terminal. The second call-setting message thus generated is transferred over the second communication channel to a predetermined third party.

That is, only those parts of the first call-setting message which say that it comes via the incoming call transfer terminal are rewritten (e.g., the calling number and called number needed to be sent from the incoming call transfer terminal to the third-party terminal). Those parts of the received first call-setting message which need to be set or transferred unchanged from the calling terminal to the third-party terminal are kept intact. The scheme thus allows the calling party's call-setting message to be transferred to the third party.

According to the invention, when a call-setting message from a calling terminal is to be transferred to a third-party terminal, a new call-setting message is generated by keeping intact those parts of the message which are needed to establish a through communication channel from the calling terminal to the third-party terminal; by also preserving such unique information in the original message as the calling sub-address and called sub-address to be sent preferably unchanged from the calling.terminal to the called terminal; and by rewriting those parts of the original message which need to be sent from the incoming call transfer terminal to the third-party terminal such as the calling number and the called number. The call-setting message of the calling terminal is transferred in this manner to the third-party terminal.

It is also possible to get the calling sub-address, called sub-address or user-user information to carry with it the calling number of the calling terminal. This allows the third-party terminal to know that the incoming call is being transferred from the incoming call transfer terminal.

These and other objects, features and advantages of the invention will become more apparent upon a reading of the following description and appended drawings.

DETAILED DESCRIPTION OF THE INVENTION

One preferred embodiment of the invention will now be described with reference to the accompanying drawings.

Figure 1:
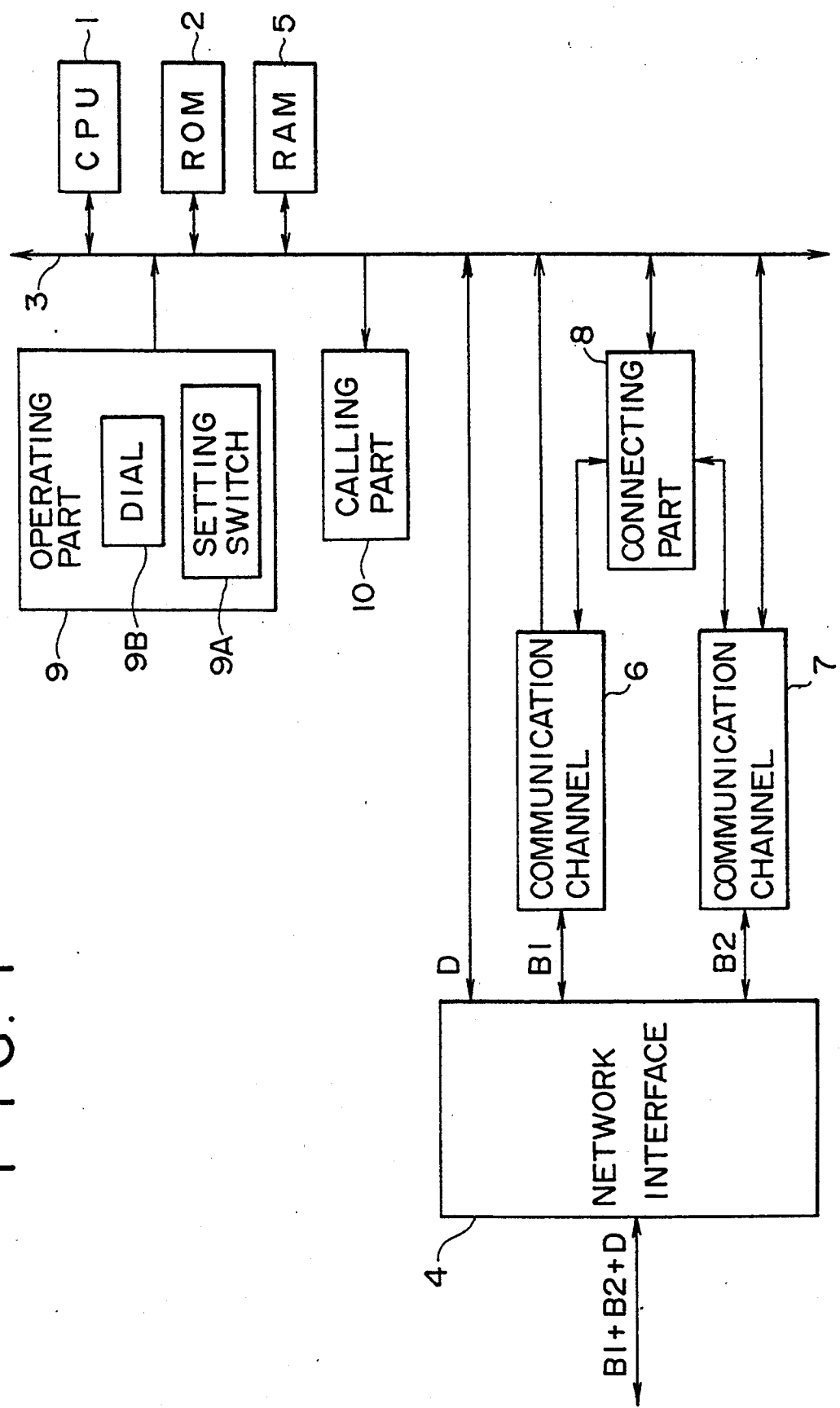
FIG. 1 is a block diagram of an incoming terminal transfer terminal practiced as a preferred embodiment of the invention.
Figure 2:
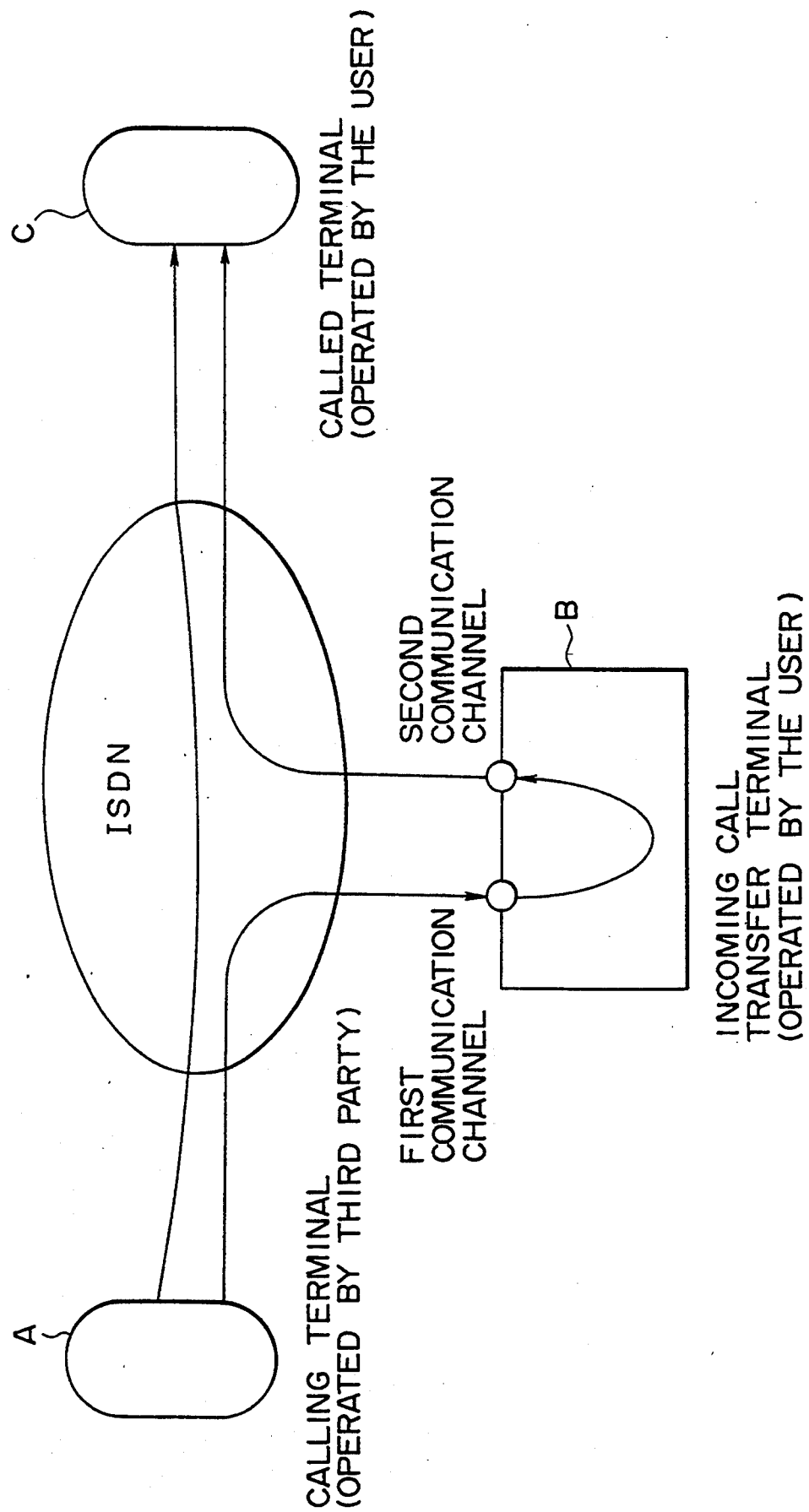
FIG. 2 is a schematic view of a typical ISDN setup.

FIG. 1 is a block diagram of an incoming terminal transfer terminal practiced as the preferred embodiment of the invention, the terminal being connected for use with a communication network such as the ISDN. FIG. 2 is a schematic view of a typical ISDN setup to which the embodiment is connected.

In FIG. 1, a CPU 1 exchanges call control information with a network interface 4 via a system bus 3 and controls the incoming call transfer terminal as a whole. The CPU 1 functions in accordance with control programs stored in a ROM 2. The ROM 2 contains programs for transferring a calling number to a third party when an incoming call is received from a calling terminal. These programs will be described later in more detail. A RAM 5, used by the CPU 1, stores call control information such as a call-setting message received at the same time as the incoming call and a new call-setting message to be transmitted to a third-party terminal.

The system bus 3 comprises a data bus, an address bus, a control bus and the like. Reference numeral 6 is a first communication channel; 7 is a second communication channel; and 8 is a connecting part that connects the channels 6 and 7. When a third-party terminal C as the destination for transfer responds to an incoming call, the connecting part 8 connects the first communication channel 6 with the second communication channel 7 to form a through communication channel between the calling terminal A and the called terminal C, through the incoming call transfer terminal B as illustrated in FIG. 2. The channels 6 and 7 are composed of a CODEC (coder-decoder), handset and the like when used for voice communication.

Referring again to FIG. 1, an operating part 9 has a dial 9B and a setting switch 9A. The setting switch 9A is used to set the subscriber number of the third-party terminal as the destination for transfer, sub-address type code of a calling sub-address, and a sub-address type code of a called sub-address. Reference numeral 10 is a calling part.

The network interface 4 connects and disconnects the D channel (a signal channel) and two information channels B1 and B2, all provided by the ISDN. Call control information is exchanged between the network interface 4 and the CPU 1 through the D channel, and terminal-to-terminal information exchanges are carried out between the channels 6 and 7 via the B1 and B2 channels.

The ISDN provides each communication terminal with two B channels over a single communication circuit (information channels for transmitting call information at a transmission speed of, say, 64 kb/s). The ISDN also furnishes each terminal with the D channel over the same communication circuit (signal channel for transmitting call control information at a transmission speed of, say, 16 kb/s) for allowing call control information such as a call-setting message and a response message to be exchanged at calling time or at called time.

The call-setting message comprises various elements of information which are needed to establish a through communication channel from a calling terminal to a third-party terminal, such as the information transmission capability of the network in question, the type of communicating terminals, channels to be used, a calling sub-address, a called sub-address, the calling party's calling number, and the called number (called party's subscriber number). In this case, the calling sub-address refers typically to the terminal number of the calling terminal.

The network interface 4 constitutes receiving means of the invention. The CPU 1 acts as call-setting message generating means, rewriting means, transmitting means and copying means of the invention.

How the incoming call transfer terminal of the above constitution works will now be described with reference to FIG. 3 outlining a transfer control protocol according to the invention. Also described are the relations of the incoming call transfer terminal to the calling terminal as well as to the third-party terminal.

In flow <1>, the incoming call transfer terminal receives a call-setting message (first call-setting message) from the calling terminal over the communication channel 6. The received call-setting message is copied to a new call-setting message to be transmitted, and the original calling number is replaced by the calling number of the incoming call transfer terminal.

The original called number is replaced by the subscriber number of a third-party terminal as the destination for transfer. This generates the new call-setting message (second call-setting message) to be transmitted to the third-party terminal. With the new call-setting message generated, flow <2> is entered. During this time, the communication channel 6 is held in a calling state.

In flow <2>, the new call-setting message of which part was rewritten is transmitted to the third-party terminal over the communication channel 7. At this point, there are yet to be established elements of information on which to carry the subscriber number of the original calling terminal. Thus the calling number of the calling terminal is conveyed on the calling sub-address, called sub-address or user-user information to the third-party terminal.

When called, the third-party terminal as the destination for transfer receives the transferred call from the incoming call transfer terminal. Directly from the call, the third-party terminal recognizes various information elements such as the information needed to establish a communication channel, the information specific to the calling terminal, and the subscriber number of the incoming call transfer terminal. After setting up the elements of information needed to establish the communication channel, the third-party terminal responds to the transferred call.

Following the response of the third-party terminal, flow <3> is reached. In flow <3>, the incoming call transfer terminal receives a response message from the third-party terminal and closes the communication channel 7. After this, flow <4> is reached.

In flow <4>, the incoming call transfer terminal transfers the response message to the calling terminal over the communication channel 6, and cancels the calling state of the channel 6 which remained in effect from flow <1>. With the communication channel 6 closed, the connecting part 8 acts to connect the communication channels 6 and 7.

The procedure above sets up a through communication channel between the calling terminal and the third-party terminal as the destination for transfer and thereby establishes a transferable state therebetween.

Figure 4:
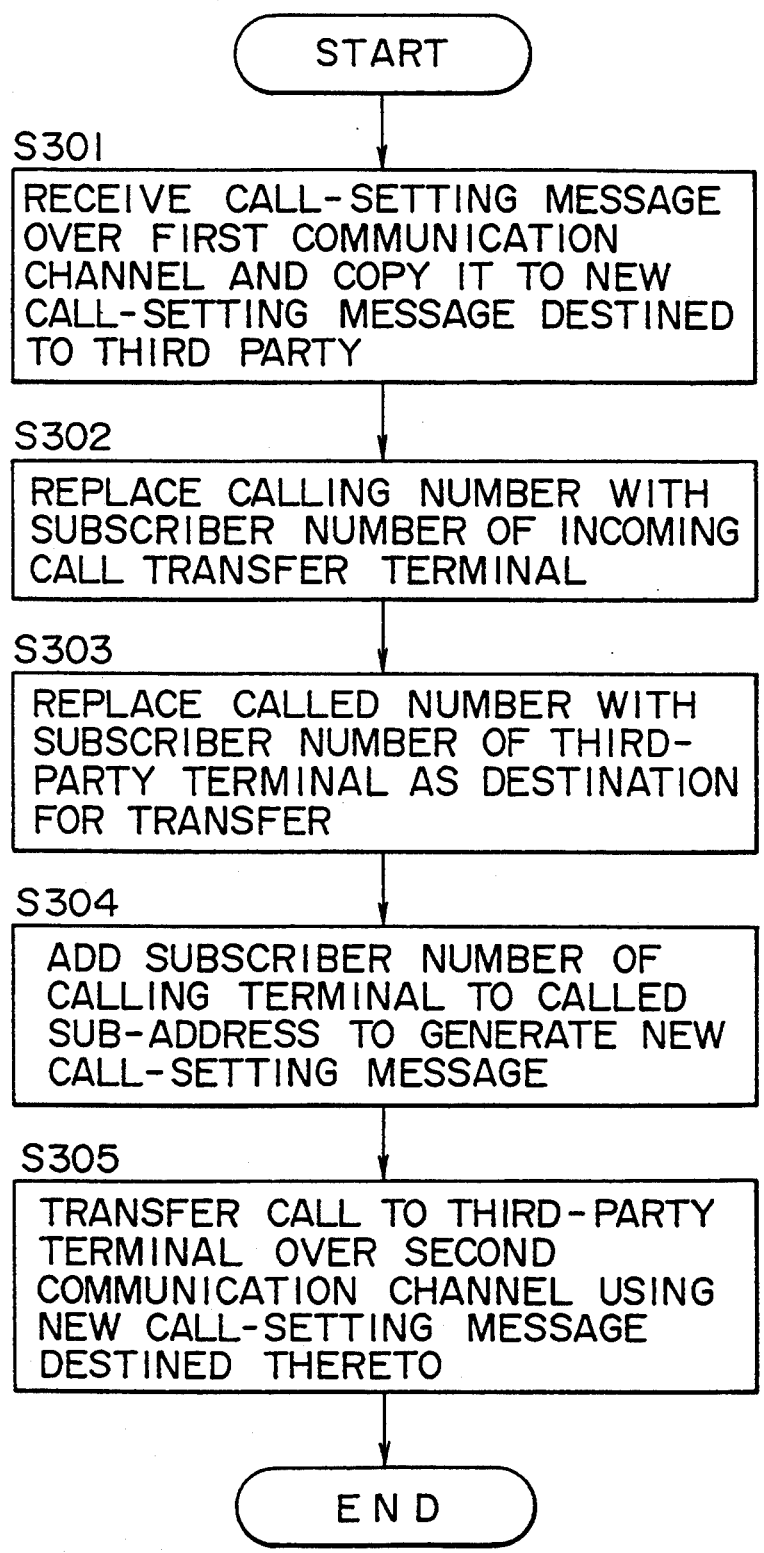
FIG. 4 is a flowchart of steps showing part of the control protocol of FIG. 3.

Below is a more detailed description of that part of the control protocol which ranges from flow <1> to flow <2> with reference to the flowchart of FIG. 4.

The network interface 4 receives the call-setting message via the D channel of the ISDN from the calling terminal over the communication channel 6. The received call-setting message is sent to the CPU 1. Given the call-setting message, the CPU 1 enters step 301 and stores the message in that area of the RAM 5 which accommodates a call-setting message to be transmitted. The CPU 1 then transmits a calling message to the calling terminal via the network interface 4 so as to keep the communication channel 6 in a calling state.

In step 302, the CPU 1 substitutes the subscriber number of the incoming call transfer terminal for the calling number in the call-setting message stored in the RAM 5. In step 303, the CPU 1 replaces the called number with the subscriber number of the third-party terminal which was set beforehand by the operating part 9. In step 304, the subscriber number of the calling terminal is copied illustratively to the called sub-address.

At this point, when the call is to be transferred from the incoming call transfer terminal to the third-party terminal, there are yet to be established elements of information on which to carry the subscriber number of the calling terminal. This requires copying the subscriber number to the called sub-address. Besides the called sub-address, the elements of information for carrying the subscriber number of the calling terminal may also be the calling sub-address or user-user information.

In the control procedure up to step 304, a new call-setting message is generated by keeping intact those parts of the call-setting message (from the calling terminal) which are needed to establish a through communication channel from the calling terminal to the third-party terminal, such as the information transmission capability of the network in question, the type of communicating terminals, and channels to be used; by also preserving such information unique to the calling terminal of the original message as the calling sub-address and called sub-address; and by rewriting those parts of the original message which need to be sent from the incoming call transfer terminal to the third-party terminal such as the calling number and the called number.

Step 304 is followed by step 305 in which the CPU 1 transmits the newly generated call-setting message to the third-party terminal over the communication channel 7. This completes the transfer control procedure.

Another Control Protocol

Figure 3:
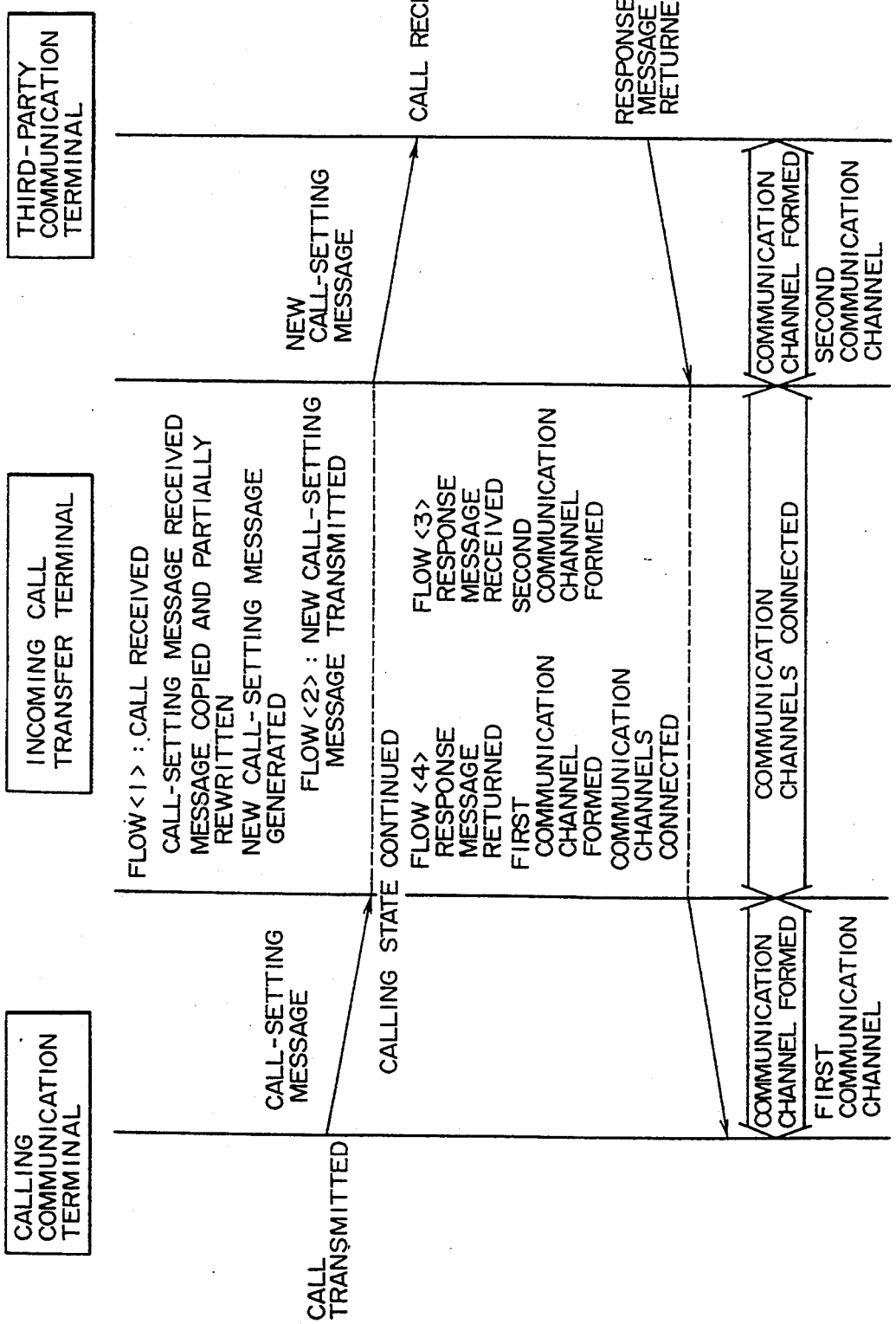
FIG. 3 is a view outlining a transfer control protocol involving call-setting messages used by the embodiment.
Figure 5:
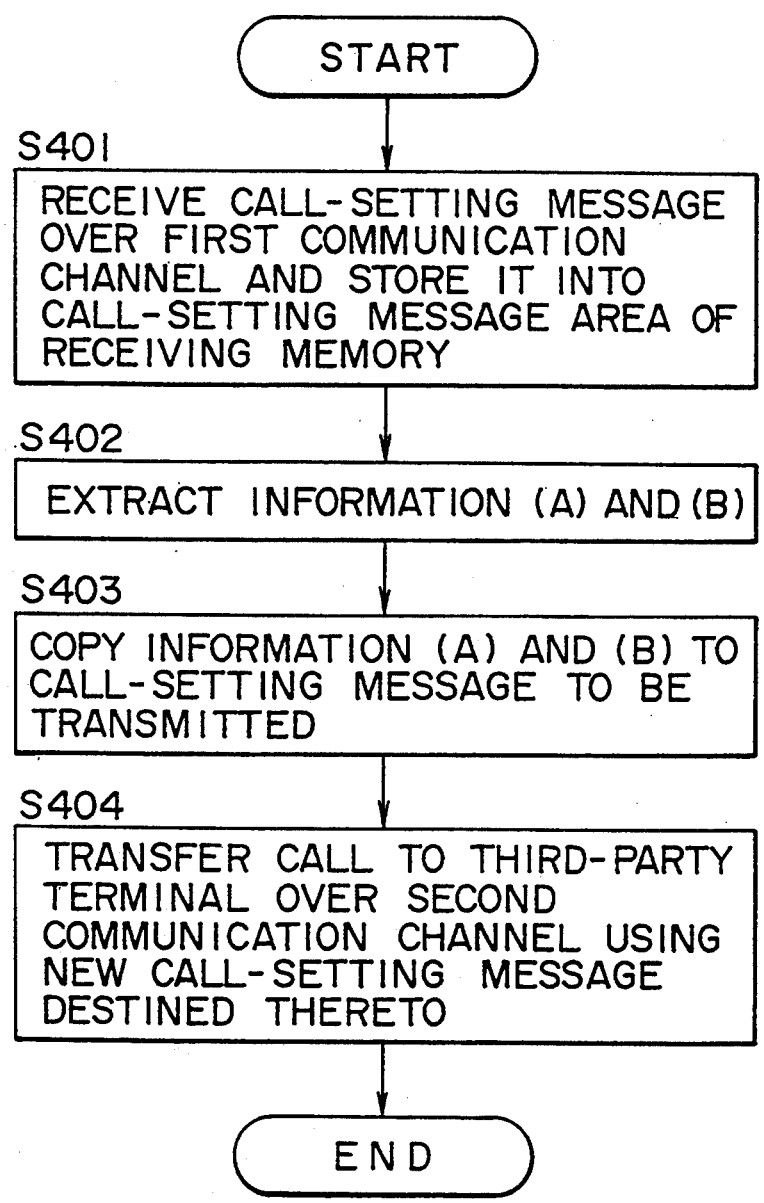
FIG. 5 is a flowchart of steps depicting another part of the control protocol of FIG. 3.

Described below with reference to FIGS. 3 and 5 is a control protocol different from that described above. FIG. 3 is a view outlining a transfer control protocol involving call-setting messages used by the embodiment, and FIG. 5 is a flowchart of steps depicting part of the control protocol of FIG. 3.

In flow <1> of FIG. 3, the incoming call transfer terminal receives a call-setting message from the calling terminal over the communication channel 6. The received message is stored temporarily. Part of the received call-setting message is copied to a call-setting message to be transmitted to a third-party terminal, whereby the new call-setting message is generated.

That part of the received call-setting message which is copied includes information elements which are needed to establish a through communication channel from the calling terminal to the third-party terminal, such as the information transmission capability of the network in question, the type of communicating terminals, and channels to be used; as well as such information unique to the calling terminal of the original message as the calling sub-address and called sub-address to be sent preferably unchanged from the calling terminal to the called terminal.

With the new call-setting message generated, flow <2> is entered. During this time, the communication channel 6 is held in the calling state. The processes starting in and subsequent to flow <2> are the same as those described in connection with the preceding control protocol.

Referring to the flowchart of FIG. 5, the network interface 4 first receives over the D channel of the ISDN the call-setting message sent from the calling terminal to the communication channel 6. The received message is forwarded to the CPU 1. Given the call-setting message, the CPU 1 enters step 401 and stores the message in that area of the RAM 5 which is set aside therein for the purpose. The CPU 1 then transmits a calling message through the network interface 4 to the calling terminal to keep the communication channel 6 in the calling state.

In step 402, the CPU 1 extracts from the received call-setting message in the RAM 5 two kinds of information (A) and (B). Information (A) comprises elements which are needed to establish a through communication channel from the calling terminal to the third-party terminal, such as the information transmission capability of the network in question, the type of communicating terminals, and channels to be used. Information (B) is such information unique to the calling terminal of the original message as the calling sub-address and called sub-address.

The information (A) defined above needs to be set unchanged from the calling terminal to the third-party terminal as the destination for transfer. The information (B) unique to the calling terminal should preferably be transmitted unchanged from the calling terminal to the third-party terminal.

In step 403, the CPU 1 copies to the call-setting message about to be transmitted not only the information (A) and (B) but also other information such as the calling number and called number needed to be sent from the incoming call transfer terminal to the third-party terminal. In this case, the call-setting message to be transmitted is stored beforehand in the area set aside for the purpose in the RAM 5.

The above steps up to step 403 generate the new call-setting message by keeping intact the information needed to be set unchanged from the calling terminal to the third-party terminal as well as the information unique to the calling terminal preferably to be transmitted unchanged therefrom to the third-party terminal; and by rewriting other information such as the calling number and called number needed to be sent from the incoming call transfer terminal to the third-party terminal.

In step 404, the CPU 1 transfers the call to the third-party terminal using the new call-setting message over the communication channel 7. This completes the above series of transfer control protocol.

Examples of Transferring the Calling Number

Described below in more detail is how the calling number received from the calling terminal at called time is transferred to a third-party terminal. As already described, the transfer is effected by one of three methods:

(1) Have the calling number carried on the calling sub-address in the call-setting message for transfer.
(2) Have the calling number carried on the called sub-address in the call-setting message for transfer.
(3) Have the calling number carried on the user-user information in the call-setting message for transfer.

The programs for effecting any of the above methods of calling number transfer are contained in the ROM 2. The setting switch 9A of the operating part 9, as discussed, is used to set the sub-address type code of the calling sub-address and that of the called sub-address.

If the sub-address type code of the calling sub-address is set, the transfer is performed by said method; if the sub-address type code of the called sub-address is set, the transfer is carried out by said method; if none of the two settings is made, the transfer is effected by said method.

Method (1) may be used when the incoming call transfer terminal is connected to a communication network such as an ISDN that provides services for communicating a calling number and a calling sub-address. Method (2) may be adopted where the incoming call transfer terminal is connected to a communication network such as an ISDN that provides services for communicating a calling number and a called sub-address. Method (3) may be utilized when the incoming call transfer terminal is connected to a communication network such as an ISDN that provides services for communicating a calling number and user-user information.

The calling sub-address and called sub-address are generally used to convey a terminal number. The NSAP (Network Service Access Points) format is used extensively as the type code for defining the way in which the sub-addresses are represented. When their uses are defined suitably between users, the calling sub-address and called sub-address may be used for purposes other than the transfer of terminal numbers. If a user-specific format is used, which is another type code for defining the sub-address representation format, then the NSAP format may be used to transmit a terminal number while the user-specific format is employed for transmitting the calling number, which is the subscriber number of the calling terminal. This is one aspect of the ISDN that the invention takes advantage of.

Operation by Method (1)

Figure 6:
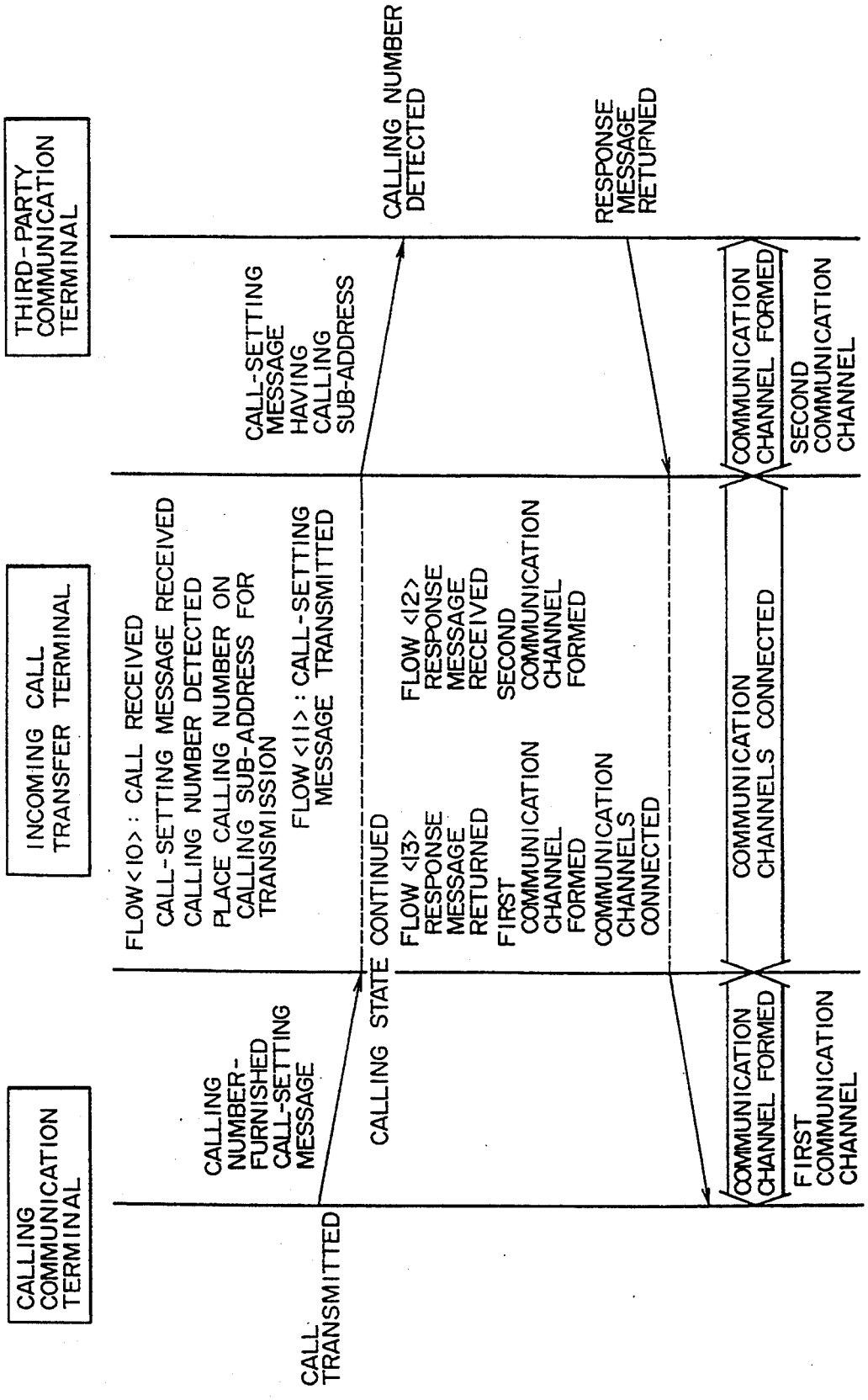
FIG. 6 is a view outlining a transfer control protocol involving a calling number-furnished call-setting message used by the embodiment.
Figure 7:
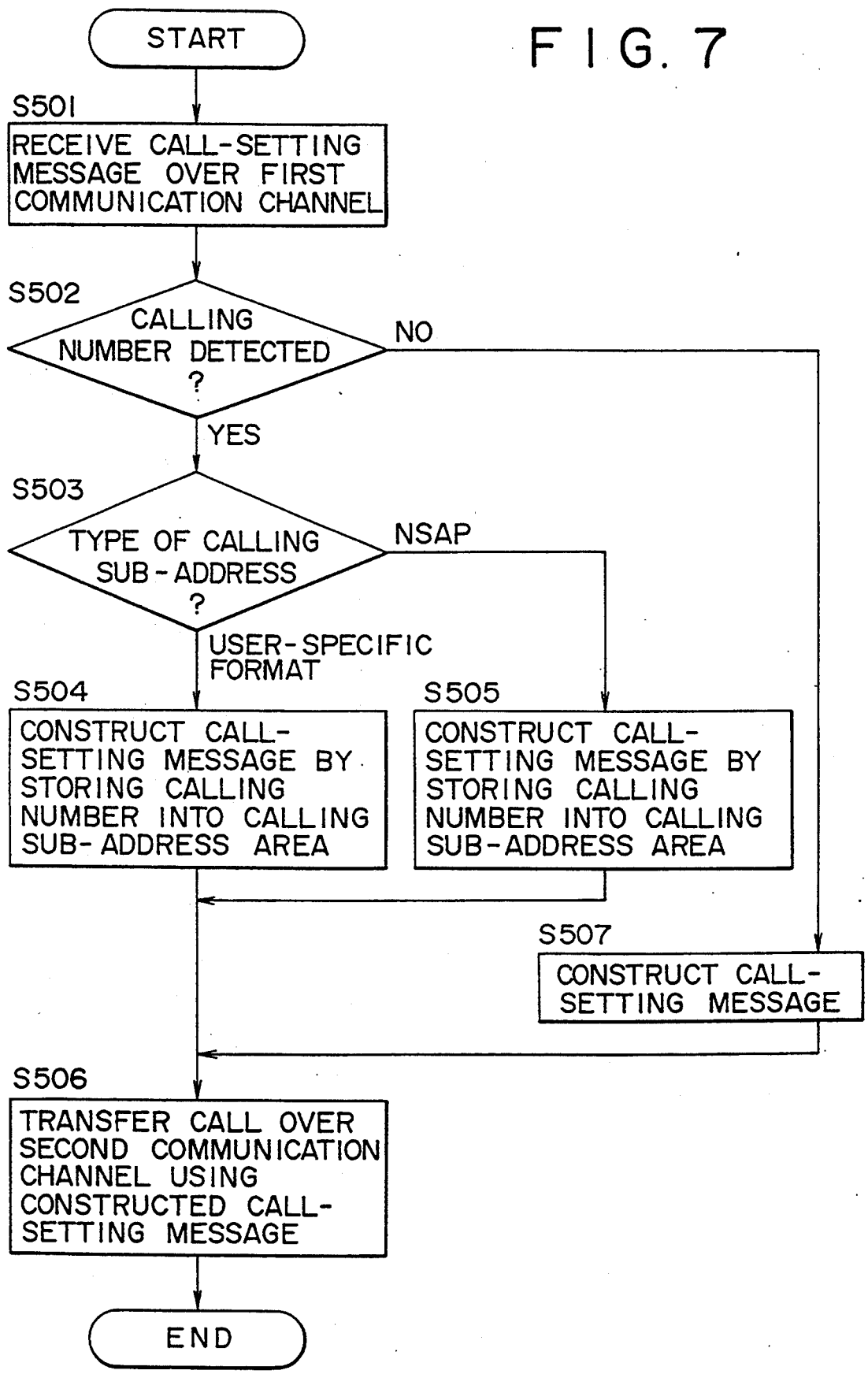
FIG. 7 is a flowchart of steps denoting part of the control protocol of FIG. 6.

FIG. 6 is a view outlining a transfer control protocol governing the operation of the incoming call transfer terminal according to method (1) above. FIG. 7 is a flowchart of steps denoting part of the control protocol of FIG. 6.

In flow <10> of FIG. 6, the incoming call transfer terminal receives on the communication channel 6 a call-setting message furnished with a calling number from a calling terminal. The calling number is detected from the received call-setting message. The detected calling number is placed as a calling sub-address on a call-setting message to be transmitted to a third-party terminal so as to send the calling number to the third-party terminal via the communication channel 7. After this, flow <11> is reached. During this time, the communication channel 6 is held in the calling state.

In flow <11>, the call-setting message carrying the calling number from the calling terminal as the calling sub-address is transmitted to the third-party terminal through the communication channel 7. In this case, the calling number of the incoming call transfer terminal is included in the call-setting message as the latter is sent to the third-party terminal.

When called, the third-party terminal detects the calling number of the calling terminal carried by the calling sub-address as well as the calling number of the incoming call transfer from the received message. The third-party terminal thus recognizes that the call is a transferred call from the incoming call transfer terminal, and verifies the calling number from the original calling terminal. When the third-party terminal responds, flow <12> is reached. In flow <12>, the incoming call transfer terminal receives the response message from the third-party terminal and closes the communication channel 7. Then flow <13> is reached.

In flow <13>, the incoming call transfer terminal outputs a response message to the calling terminal via the communication channel 6, cancels the calling state that continued from flow <10>, and closes the communication channel 6. The connecting part 8 is then activated to connect the communication channels 6 and 7. The control procedure above sets up a through communication channel between the calling terminal and the third-party terminal as the destination for transfer and thereby establishes a transferable state therebetween.

In the flowchart of FIG. 7, the network interface 4 first receives over the D channel of the ISDN the calling number-furnished call-setting message sent from the calling terminal to the communication channel 6. The received message is forwarded to the CPU 1.

Given the call-setting message, the CPU 1 enters step 501 and stores the received message in that area of the RAM 5 which is set aside therein for the purpose. The CPU 1 then transmits a calling message through the network interface 4 to the calling terminal to keep the communication channel 6 in the calling state.

In step 502, the CPU 1 detects the calling number from the call-setting message stored in the RAM 5. If no calling number is detected from the stored message, step 507 is reached. In step 507, a call-setting message to be transmitted to the third-party terminal is constructed without storing a calling number in a calling sub-address area of that message. Step 507 is followed by step 506, which will be described later.

If the calling number is detected from the call-setting message received and stored, step 503 is reached. In step 503, a check is made to see if the calling sub-address type code set by the setting switch 9A of the operating part 9 is in a user-specific format or in the NSAP format. If the calling sub-address type code is in the user-specific format, step 504 is reached. In step 504, the call-setting message to be transmitted to the third-party terminal is constructed by storing the calling number in the user-specific format into the calling sub-address area of that message in the RAM 5. In this case, the generally used NSAP format may be used to transmit a terminal number.

If the calling sub-address type code is found to be in the NSAP format in step 503, step 505 is reached. In step 505, the call-setting message to be transmitted to the third-party terminal is constructed by storing the calling number in the NSAP format into the calling sub-address area of that message in the RAM 5. In this case, the NSAP format, which is used generally to indicate a terminal number, is used to denote both the calling number and the terminal number.

In step 506, the CPU 1 transfers the call to the third-party terminal over the communication channel 7 using the call-setting message that was constructed in step 504 or 505 and held in the proper area of the RAM 5. This completes the above series of transfer control protocol.

Operation by Method (2)

Figure 8:
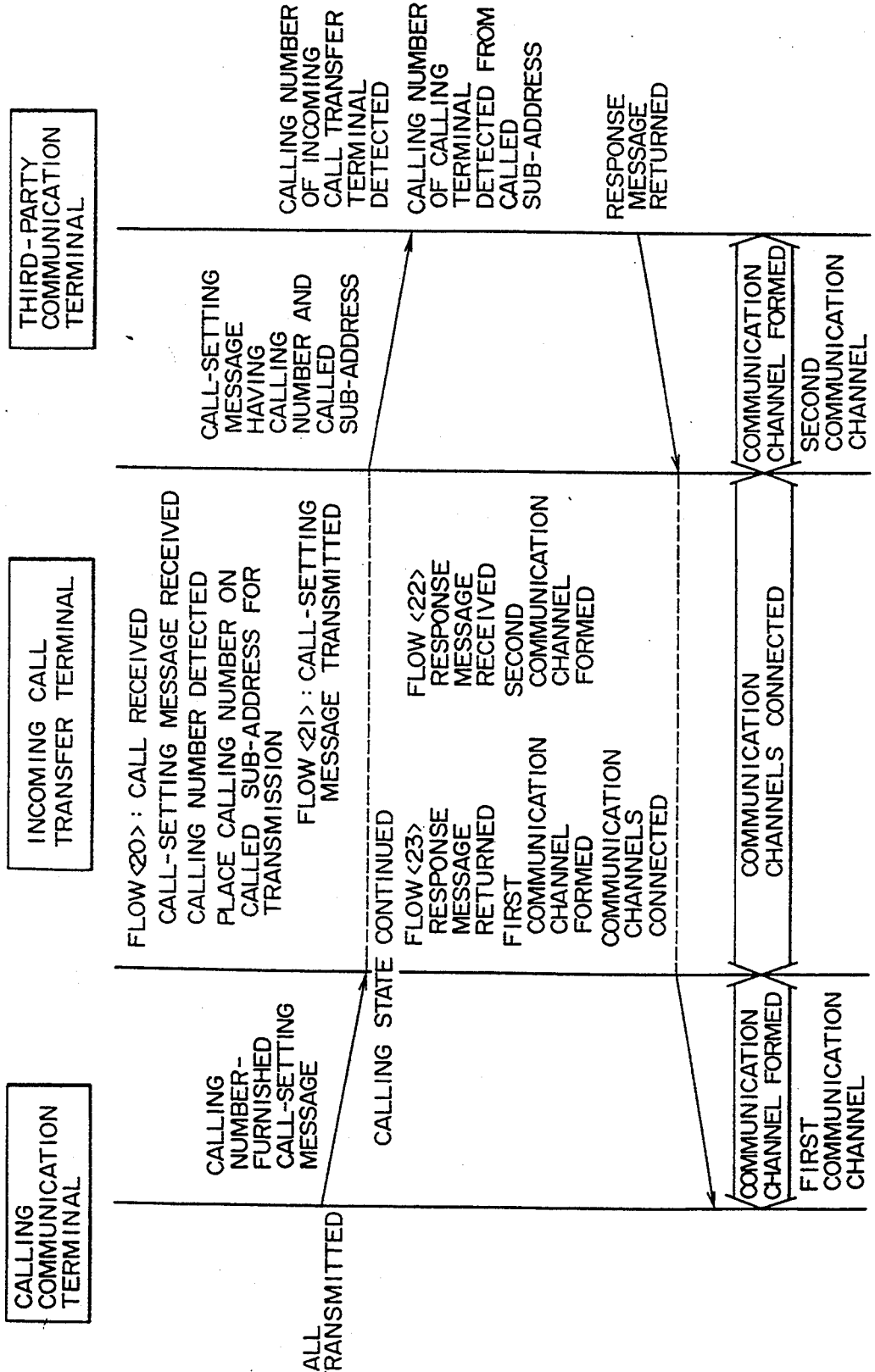
FIG. 8 is a view outlining another transfer control protocol involving a calling number-furnished call-setting message used by the embodiment.
Figure 9:
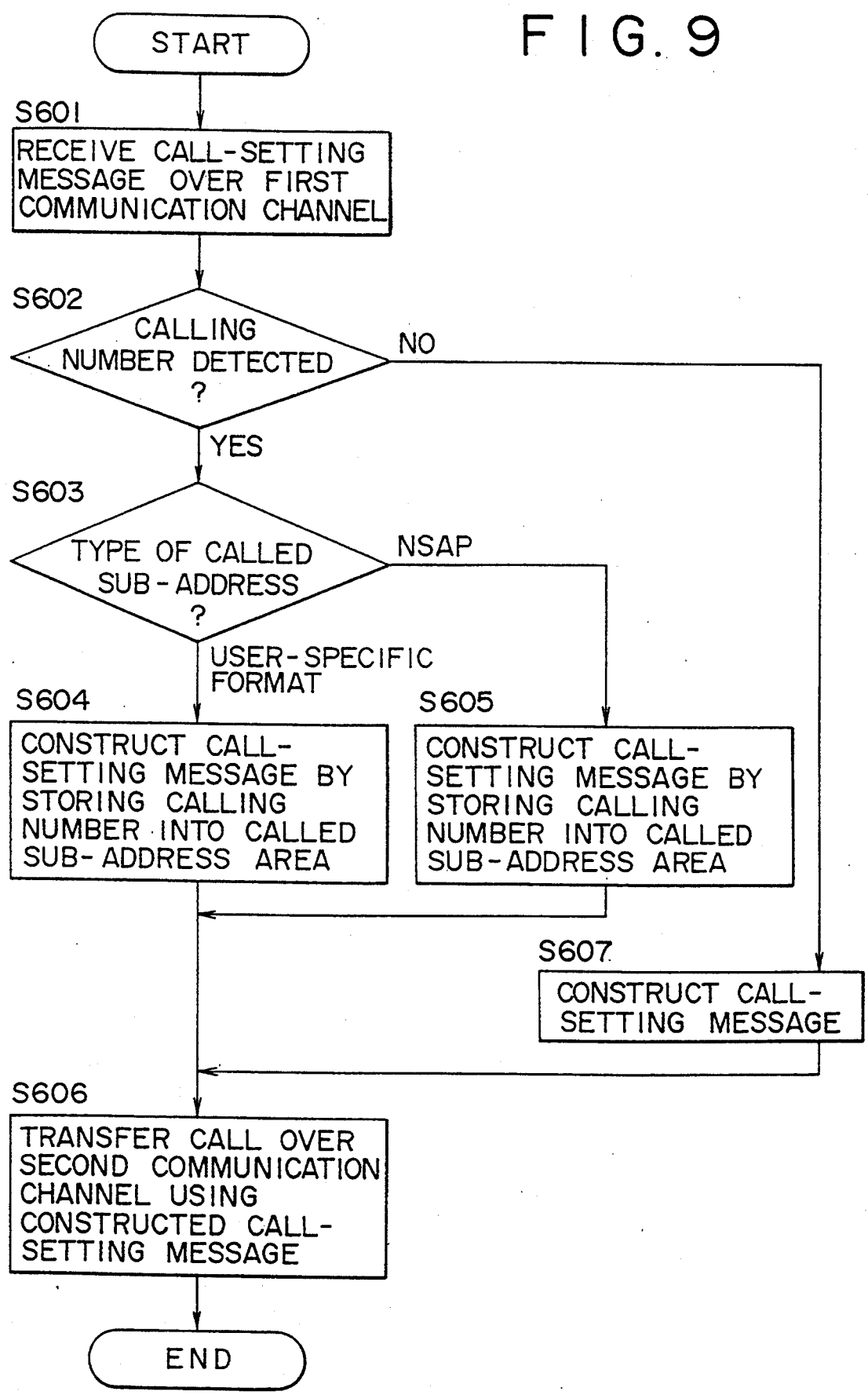
FIG. 9 is a flowchart of steps showing part of the control protocol of FIG. 8.

FIG. 8 is a view outlining another transfer control protocol governing the operation of the incoming call transfer terminal according to method (2) above, and FIG. 9 is a flowchart of steps showing part of the control protocol of FIG. 8.

In flow <20> of FIG. 8, the incoming call transfer terminal receives on the communication channel 6 a call-setting message furnished with a calling number from a calling terminal. The calling number is detected from the received call-setting message. The detected calling number is placed as a called sub-address on a call-setting message to be transmitted to a third-party terminal so as to send the calling number to the third-party terminal via the communication channel 7. After this, flow <21> is reached. During this time, the communication channel 6 is held in the calling state.

In flow <21>, the call-setting message carrying the calling number from the calling terminal as the called sub-address is transmitted to the third-party terminal through the communication channel 7. In this case, the calling number of the incoming call transfer terminal is included in the call-setting message as the latter is sent to the third-party terminal.

When called, the third-party terminal detects the calling number of the calling terminal carried by the called sub-address as well as the calling number of the incoming call transfer from the received message. The third-party terminal thus recognizes that the call is a transferred call from the incoming call transfer terminal, and verifies the calling number from the original calling terminal. When the third-party terminal responds, flow <22> is reached. In flow <22>, the incoming call transfer terminal receives the response message from the third-party terminal and closes the communication channel 7. Then flow <23> is reached.

In flow <23>, the incoming call transfer terminal outputs a response message to the calling terminal via the communication channel 6, cancels the calling state that continued from flow <20>, and closes the communication channel 6. The connecting part 8 is then activated to connect the communication channels 6 and 7. The control procedure above sets up a through communication channel between the calling terminal and the third-party terminal as the destination for transfer and thereby establishes a transferable state therebetween.

Under the above control protocol, the calling number of the calling terminal is carried on the called sub-address for transmission to the third-party terminal. Where the calling terminal has sent to the incoming call transfer terminal the calling party's personal identification information carried on the calling sub-address, the above protocol allows the personal identification information received in flow <20> to be carried on the calling sub-address in flow <21> for transfer to the third-party terminal.

In that case, the third-party terminal can recognize the calling party's personal identification information carried on the calling sub-address, and two calling numbers. One calling number, coming from the calling terminal, is received as carried on the called sub-address when the third-party terminal is being called. The other calling number, of the incoming call transfer terminal, is received as carried on the calling number.

Referring now to the flowchart of FIG. 9, the network interface 4 first receives over the D channel of the ISDN the calling number-furnished call-setting message sent from the calling terminal to the communication channel 6. The received message is forwarded to the CPU 1.

Given the call-setting message, the CPU 1 enters step 601 and stores the received message in that area of the RAM 5 which is set aside therein for the purpose. The CPU 1 then transmits a calling message through the network interface 4 to the calling terminal to keep the communication channel 6 in the calling state.

In step 602, the CPU 1 detects the calling number from the call-setting message stored in the RAM 5. If no calling number is detected from the stored message, step 607 is reached. In step 607, a call-setting message to be transmitted to the third-party terminal is constructed without storing a calling number in a called sub-address area of that message. Step 607 is followed by step 606, which will be described later.

If the calling number is detected from the call-setting message received and stored, step 603 is reached. In step 603, a check is made to see if the called sub-address type code set by the setting switch 9A of the operating part 9 is in a user-specific format or in the NSAP format. If the called sub-address type code is in the user-specific format, step 604 is reached. In step 604, the call-setting message to be transmitted to the third-party terminal is constructed by storing the calling number in the user-specific format into the called sub-address area of that message in the RAM 5. In this case, the generally used NSAP format may be used to transmit a terminal number.

If the called sub-address type code is found to be in the NSAP format in step 603, step 605 is reached. In step 605, the call-setting message to be transmitted to the third-party terminal is constructed by storing the calling number in the NSAP format into the called sub-address area of that message in the RAM 5. In this case, the NSAP format, which is used generally to indicate a terminal number, is used to denote both the calling number and the terminal number.

In step 606, the CPU 1 transfers the call to the third-party terminal over the communication channel 7 using the call-setting message that was constructed in step 604 or 605 and held in the area set aside for the purpose in the RAM 5. This completes the above series of transfer control protocol.

Operation by Method (3)

Figure 10:
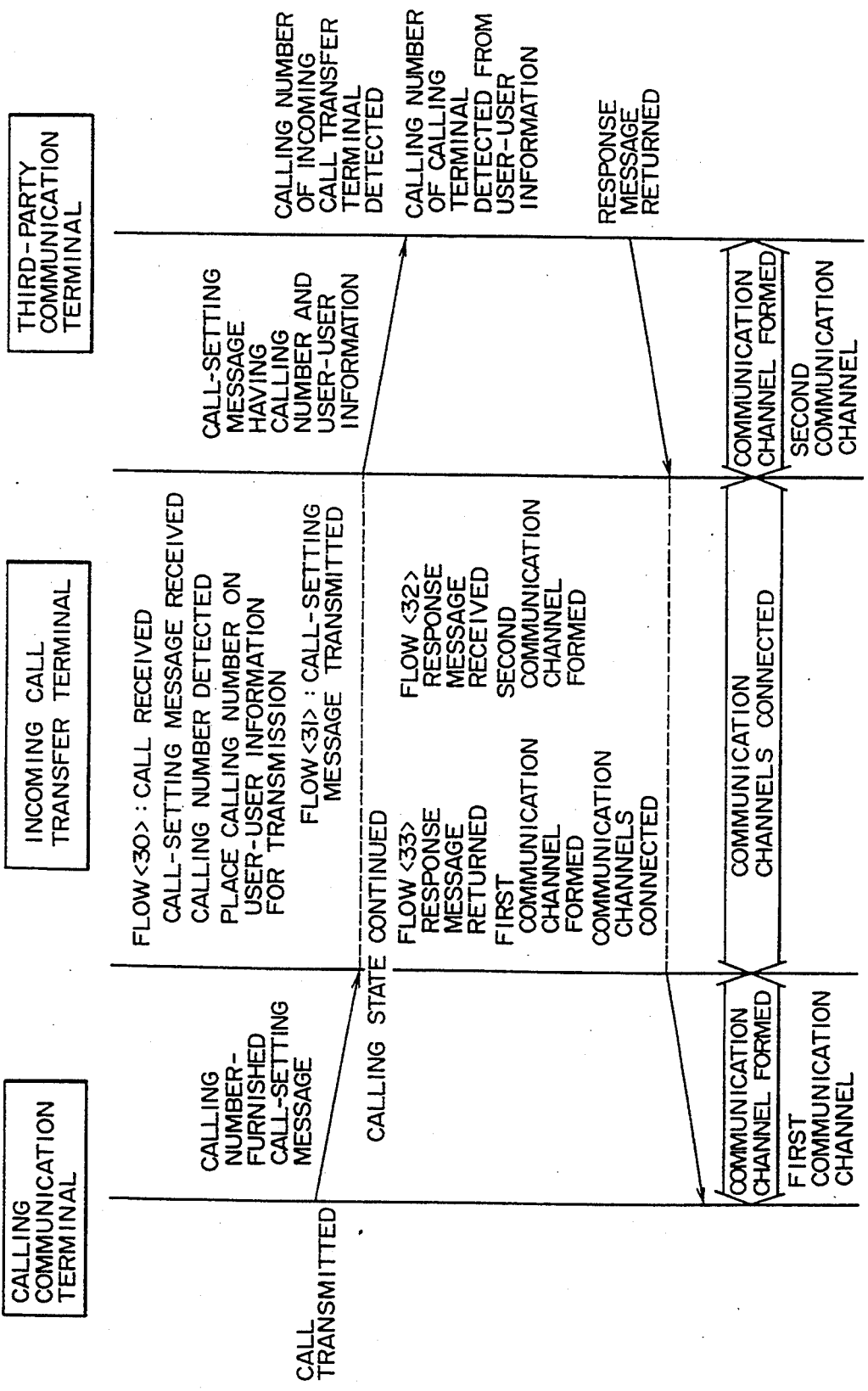
FIG. 10 is a view outlining a further transfer control protocol involving a calling number-furnished call-setting message used by the embodiment.
Figure 11:
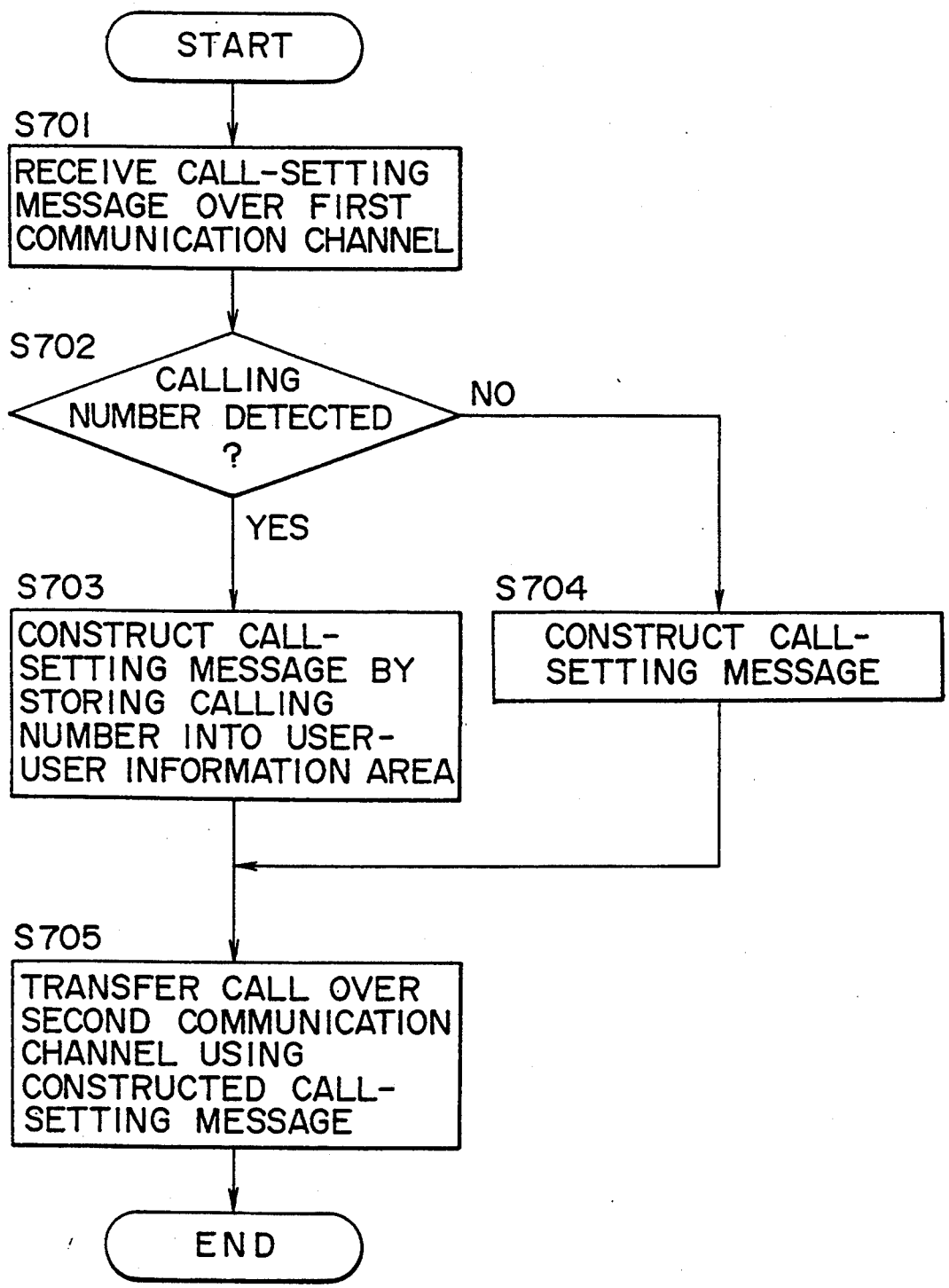
FIG. 11 is a flowchart of steps depicting part of the control protocol of FIG. 10.

FIG. 10 is a view outlining another transfer control protocol governing the operation of the incoming call transfer terminal according to method (3) above, and FIG. 11 is a flowchart of steps showing part of the control protocol of FIG. 10.

In flow <30> of FIG. 10, the incoming call transfer terminal receives on the communication channel 6 a call-setting message furnished with a calling number from a calling terminal. The calling number is detected from the received call-setting message. The detected calling number is placed as user-user information on a call-setting message to be transmitted to a third-party terminal so as to send the calling number to the third-party terminal via the communication channel 7. After this, flow <31> is reached. During this time, the communication channel 6 is held in the calling state.

In flow <31>, the call-setting message carrying the calling number from the calling terminal as the user-user information is transmitted to the third-party terminal through the communication channel 7. In this case, the calling number of the incoming call transfer terminal is included in the call-setting message as the latter is sent to the third-party terminal.

When called, the third-party terminal detects the calling number of the calling terminal carried by the user-user information as well as the calling number of the incoming call transfer from the received message. The third-party terminal thus recognizes that the call is a transferred call from the incoming call transfer terminal, and verifies the calling number from the original calling terminal. When the third-party terminal responds, flow <32> is reached. In flow <32>, the incoming call transfer terminal receives the response message from the third-party terminal and closes the communication channel 7. Then flow <33> is reached.

In flow <33>, the incoming call transfer terminal outputs a response message to the calling terminal via the communication channel 6, cancels the calling state that continued from flow <30>, and closes the communication channel 6. The connecting part 8 is then activated to connect the communication channels 6 and 7. The control procedure above sets up a through communication channel between the calling terminal and the third-party terminal as the destination for transfer and thereby establishes a transferable state therebetween.

In the flowchart of FIG. 11, the network interface 4 first receives over the D channel of the ISDN the calling number-furnished call-setting message sent from the calling terminal to the communication channel 6. The received message is forwarded to the CPU 1.

Given the call-setting message, the CPU 1 enters step 701 and stores the received message in that area of the RAM 5 which is set aside therein for the purpose. The CPU 1 then transmits a calling message through the network interface 4 to the calling terminal to keep the communication channel 6 in the calling state.

In step 702, the CPU 1 detects the calling number from the call-setting message stored in the RAM 5. If no calling number is detected from the stored message, step 704 is reached. In step 704, a call-setting message to be transmitted to the third-party terminal is constructed without storing a calling number in a user-user information area of that message. Step 704 is followed by step 705, which will be described later.

If the calling number is detected from the call-setting message received and stored, step 703 is reached. In step 703, the call-setting message to be transmitted to the third-party terminal is constructed by storing the calling number into the user-user information area of that message in the RAM 5. In this case, the message originating from the incoming call transfer terminal is described in compliance with the user-user information and is transmitted as such.

In step 705, the CPU 1 transfers the call to the third-party terminal over the communication channel 7 using the call-setting message that was constructed in step 703 and held in the proper area of the RAM 5. This completes the above series of transfer control protocol.

As described, the incoming call transfer terminal as embodied above generates, given a call-setting message from a calling terminal, a new call-setting message by keeping intact those parts of the original call-setting message which are needed to establish a through communication channel from the calling terminal to a third-party terminal, such as the information transmission capability of the network in question, the type of communicating terminals, and channels to be used; by also preserving such information unique to the calling terminal of the original message as the calling sub-address and called sub-address; and by rewriting those parts of the original message which need to be sent from the incoming call transfer terminal to the third-party terminal such as the calling number and the called number.

Besides generating the new call-setting message, the embodiment of the invention transfers to the third-party terminal the calling number attached to the call-setting message from the calling terminal as well as the calling number of the incoming call transfer terminal, the calling number of the calling terminal being carried on the calling sub-address, called sub-address or user-user information in the message.

When called, the third-party terminal knows that the call is a transferred call from the incoming call transfer terminal and recognizes the calling number of the original calling terminal. This allows the third-party terminal to choose from a number of possible ways to deal with the call being received.

In the above embodiment, the ROM 2 contains the programs that run according to the three methods for transferring to a third-party terminal the calling number of a calling terminal when a call is being received from the latter. Alternatively, any other appropriate program may be selected from a plurality of options to comply with the communication network currently in use.

Although the above embodiment is applied to a communication network such as the ISDN, the calling terminal need not be configured within the ISDN. Alternatively, the invention may be applied to a communication network having the ability to transfer calling numbers or to a communication network capable of transmitting calling numbers through connections based on special numbers.

While a specific embodiment of the invention has been shown and disclosed, it is to be understood that numerous changes and modifications may be made by those skilled in the art without departing from the scope and intent of the invention.

What is claimed is:

1. An incoming call transfer terminal comprising:
   receiving means for receiving a first call-setting message transmitted from a calling terminal over a first communication channel;
   call-setting message generating means for generating a second call-setting message by copying a first part of the first call-setting message which needs to be transferred from said calling terminal to a third party terminal and by rewriting a second part of said first call-setting message which needs to be communicated to said third-party terminal; and
   transmitting means for calling said third-party terminal over a second communication channel to transmit said second call-setting message generated by said call-setting message generating means to said third-party terminal.

2. An incoming call transfer terminal according to claim 1, wherein the first part of said first call-setting message includes said second part which is needed to establish a through communication channel from said calling terminal to said third-party terminal as well as said first part which is to be transferred unchanged from said calling terminal to said third-party terminal.

3. An incoming call transfer terminal according to claim 2, wherein said second part of said received first call-setting message which is needed to establish a through communication channel from said calling terminal to said third-party terminal includes the information transmission capability, the type of communicating terminals, and channels to be used; and said first part which is to be transferred unchanged from said calling terminal to said third party terminal includes the information specific to a calling party at said calling terminal including a calling sub-address and a called sub-address.

4. An incoming call transfer terminal according to claim 1, wherein said call-setting message generating means generates said second call-setting message by copying said first part of the first call-setting message to a predetermined second call-setting message memory location.

5. An incoming call transfer terminal according to claim 1, wherein said call-setting message generating means comprises:
   extracting means for extracting from said first call-setting message a subscriber number of a calling party at said calling terminal; and
   copying means for copying said subscriber number to a calling sub-address of said second call-setting message.

6. An incoming call transfer terminal according to claim 5, wherein said copying means copies said calling number to said calling sub-address in a predefined format.

7. An incoming call transfer terminal according to claim 5, wherein said copying means copies said calling number to said calling sub-address in user specific format.

8. An incoming call transfer terminal according to claim 1, wherein said call-setting message generating means comprises:
   extracting means for extracting from said first call-setting message a calling number of a calling party; and
   copying means for copying said calling number to a called sub-address of said second call-setting message.

9. An incoming call transfer terminal according to claim 8, wherein said copying means copies said calling number to said called sub-address in a predefined format.

10. An incoming call transfer terminal according to claim 8, wherein said copying means copies said calling number to said called sub-address in user specific format.

11. An incoming call transfer terminal according to claim 1, wherein said call-setting message generating means comprises:

extracting means for extracting from said first call-setting message a subscriber number of a calling party at said calling terminal; and copying means for copying said subscriber number as user-user information of the second call-setting message.

12. A method for transferring a call from an incoming call transfer terminal to a third-party terminal comprising the steps of:

a) receiving a first call-setting message at an incoming call transfer terminal from a calling terminal, said first call-setting message having a calling number;
b) detecting the calling number in said first call-setting message at the incoming call transfer terminal;
c) placing the detected calling number in a select portion of a third-party call-setting message;
d) transmitting the third-party call-setting message to the third-party;
e) detecting the calling number from the calling terminal at the third-party terminal; and
f) connecting the third-party with the calling terminal.

13. The method of claim 12, wherein the select portion of the third-party call-setting message is a calling sub-address.

14. The method of claim 12, wherein the select portion of the third-party call-setting message is a called sub-address.

15. The method of claim 12, wherein the select portion of the third-party call-setting message is a user-user information location.

* * * * *

UNITED STATES PATENT AND TRADEMARK OFFICE
CERTIFICATE OF CORRECTION

PATENT NO. : 5,422,942
DATED : June 6, 1995
INVENTOR(S) : Isao Kawashima

It is certified that error appears in the above-indentified patent and that said Letters Patent is hereby corrected as shown below:

Please change the name of the inventor from --Isao Kakwashima-- to --Isao Kawashima--.

Signed and Sealed this

Sixteenth Day of January, 1996

*Attest:*

BRUCE LEHMAN

*Attesting Officer*  *Commissioner of Patents and Trademarks*